(12) United States Patent
Lommen et al.

(10) Patent No.: US 7,817,095 B2
(45) Date of Patent: Oct. 19, 2010

(54) TIGHT-FITTING GARMENT INCLUDING A SENSOR FOR MEASURING LENGTH AND/OR SHAPE

(75) Inventors: Antonius Hubertus Joannes Gerardus Lommen, Grubbenvorst (NL); Hubregt Jannis Visser, Veldhoven (NL); Gerardus Johannes Nicolaas Doodeman, Veldhoven (NL); Helena de Voogd-Claessen, Leiden (NL)

(73) Assignee: Nederlandse Organisatie voor toegepast-natuurwetenschappelijk onderzoek TNO

( * ) Notice: Subject to any disclaimer, the term of this patent is extended or adjusted under 35 U.S.C. 154(b) by 153 days.

(21) Appl. No.: 11/994,622

(22) PCT Filed: Jul. 6, 2006

(86) PCT No.: PCT/NL2006/000340

§ 371 (c)(1),
(2), (4) Date: Apr. 17, 2008

(87) PCT Pub. No.: WO2007/004872

PCT Pub. Date: Jan. 11, 2007

(65) Prior Publication Data

US 2008/0224934 A1    Sep. 18, 2008

(30) Foreign Application Priority Data

Jul. 6, 2005    (EP) .................................. 05076562

(51) Int. Cl.
  *H01Q 1/12* (2006.01)
  *H01Q 9/16* (2006.01)
(52) U.S. Cl. ...................................... 343/718; 343/823
(58) Field of Classification Search ................. 343/718, 343/897, 793, 795, 823; 139/421; 428/375; 442/181, 184; 600/388
See application file for complete search history.

(56) References Cited

U.S. PATENT DOCUMENTS

| | | | |
|---|---|---|---|
| 6,483,469 B2 * | 11/2002 | Boyle | 343/718 |
| 6,677,917 B2 * | 1/2004 | Van Heerden et al. | 343/897 |
| 6,867,740 B2 * | 3/2005 | Goodyear | 343/718 |
| 7,319,895 B2 * | 1/2008 | Klefstad-Sillonville et al. | 600/388 |
| 7,337,810 B2 * | 3/2008 | Orr et al. | 139/421 |
| 2004/0198117 A1 * | 10/2004 | Caudell | 442/181 |
| 2005/0282009 A1 * | 12/2005 | Nusko et al. | 428/375 |
| 2006/0281382 A1 * | 12/2006 | Karayianni et al. | 442/181 |

FOREIGN PATENT DOCUMENTS

| | | |
|---|---|---|
| DE | 10342787 | 5/2004 |
| FR | 2387458 | 12/1987 |
| WO | WO 03/071474 | 8/2003 |
| WO | WO 2006/008325 | 1/2006 |
| WO | WO 2007/004782 | 1/2007 |

* cited by examiner

*Primary Examiner*—Hoang V Nguyen
(74) *Attorney, Agent, or Firm*—Swanson & Bratschun, L.L.C.

(57) ABSTRACT

A tight-fitting garment comprising a dipole resonator which is adapted to vary its length and/or shape in conformity with the length and/or shape variations of a person wearing the garment. The length and/or shape of the resonator determines the resonance frequency which can be detected by a reflection analyzer. The dipole resonator comprises at least one elastic core around which a conductive wire is wound. The dipole resonator is further suitable to elastically deform along with the tight-fitting garment.

18 Claims, 2 Drawing Sheets

TIGHT-FITTING GARMENT INCLUDING A SENSOR FOR MEASURING LENGTH AND/OR SHAPE

RELATED APPLICATIONS

This application is a 35 U.S.C. §371 national phase application of PCT/NL2006/000340 (WO 2007/004872), filed on Jul. 6, 2006, entitled "Tight-Fitting Garment Including a Sensor for Measuring Length and/or Shape", which application claims the benefit of European Application Serial No. EP 05076562.7, filed Jul. 6, 2005, each of which is incorporated herein by reference in its entirety.

FIELD

The invention concerns a tight-fitting garment.

BACKGROUND

In e.g. sports and health care it is of growing interest and importance to monitor the human and/or animal condition and physiological performance during their activities. Monitoring means for collecting parameters representative for the human performance are e.g. heart rate sensors, temperature sensors and movement sensors for velocity and acceleration of the body or body parts. More and more, there is an interest to integrate these devices into the clothing (or even the human being itself).

Length and/or shape displacement and/or position sensors based on mechanical (wire strain gauges) or optical principles (laser) are in general not designed for application in textiles: components are large, heavy, not wireless or contactless and in general they lower the feeling of comfort of the clothing. Besides that, the components are not machine-washable.

SUMMARY

The tight-fitting garment presented hereafter aims to facilitate remote measuring of length and/or shape variations of an object, e.g. a human body, and thus to monitor the condition and/or physiological performance of humans without causing discomfort or hindrance. To that end the garment comprises a dipole resonator which is adapted to vary its length and/or shape in conformity with the length and/or shape variations of a person and/or animal wearing the garment, the length and/or shape of the resonator determining a resonance frequency of the resonator, wherein the resonator is arranged to resonate a detectable signal at the dipole resonator's resonance frequency, wherein the resonator comprises at least one elastic core and a conductive wire supported by the at least one elastic core suitable to elastically deform along with tight-fitting garments. Suitably, the elastic core may comprise, for instance, an elastane, such as lycra, elaspan, dorlastan or linel. Another possibility is that the elastic core comprises a rubber. Due to body movements, length and/or shape variations of the dipole resonator will give varying resonance frequencies which can be measured by the detecting means. By measuring the resonance frequencies the corresponding length and/or shapes variations of the dipole resonator can be computed, resulting in information about the body movements.

Preferably, the dipole resonator comprises a flexible, i.e. capable of being bent and/or flexed, dipole element: bending or flexing will change the effective length of the dipole and, in consequence, the resonance frequency. Preferably, the dipole element is elastic, i.e. capable of being stretched and/or expanded, by stretching and shrinking the real length of the dipole will change and thus the resonance frequency.

Pointing to the dipole's preferred embodiments, the dipole resonator preferably comprises flexible and/or elastic support means which support (electrically) conductive means. The dipole resonator preferably has the form of a filament, which can be incorporated in textile, e.g. garments which may be worn upon the relevant human body.

The dipole resonator may be a half wave dipole resonator. The detection means for remote detection of the dipole resonator's resonance frequency preferably comprises a spectrum analyzer.

EXEMPLARY EMBODIMENT

Figure 1:
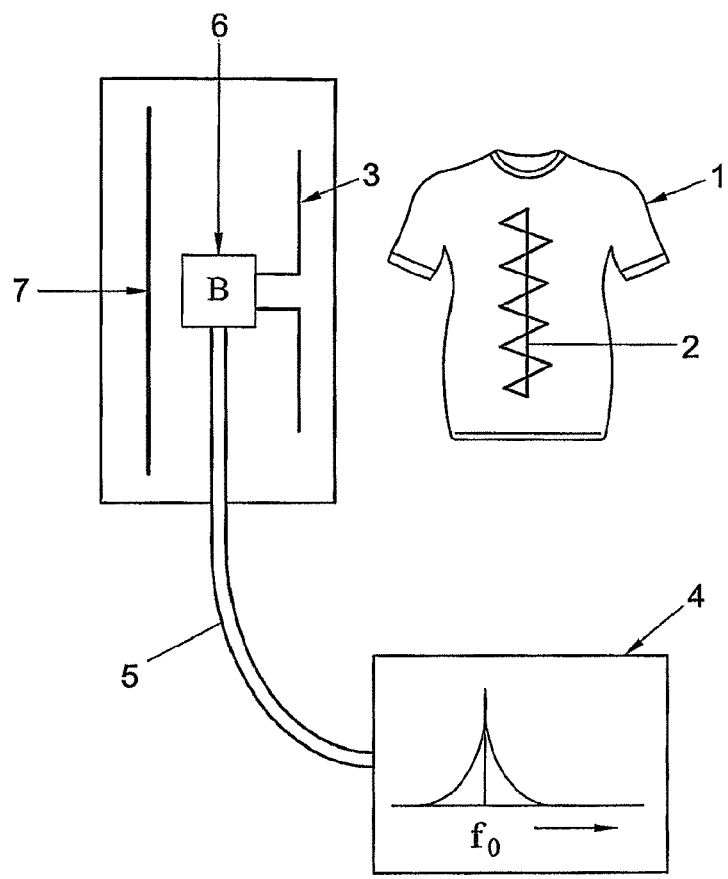
FIG. 1 shows an exemplary embodiment of the garment according to the invention.

FIG. 1 shows an exemplary embodiment of the garment. The garment 1 comprises a dipole resonator 2 which is adapted to vary its length and/or shape in conformity with the length and/or shape variations of the person and/or animal wearing the garment 1. The dipole resonator 2 may be attached to the garment 1 or integrated in it, e.g. being part of the garment's textile fibre.

Moreover, detection means are provided which are fit to remotely detect the dipole resonator's resonance frequency. The detection means comprise a conventional (straight wire) dipole antenna 3 in combination with a reflection analyzer 4, interconnected by a coax cable 5 and a "BALUN" (Balanced/Unbalanced) 6, i.e. a device that connects the asymmetric (coax) cable 5 to the symmetric antenna 3. The device is completed by a dipole reflector 7. The components 3, 6 and 7 are integrated in a handheld or standalone device which has to be held at a certain distance of the flexible resonator 2.

If the dipole resonator is a half wave dipole resonator its resonance frequency is $f_0 = C_0/\lambda$, in which $C_0$ is the light velocity ($3.10^8$ m/s). Length and/or shape variations of the elastic and/or flexible half wave dipole resonator 2 due to body movements will result in variations in the resonator's resonance frequency. By monitoring the resonator's resonance frequency by the reflection analyzer 4 the corresponding (effective or real) length variations of the half wave dipole resonator 2 can be calculated and thus remote information of the person's body and/or the animal's body movements can be collected remotely.

The garment 1 may contain several resonators 2 and in order to distinguish the various resonators, each resonator may contain additional identification data based on integrated Surface Acoustic Waveguide or Integrated Circuit devices. Such devices may be integrated in or connected to the resonator(s) 2. The reflection analyzer 4 comprises or is connected to a data processor for processing (computing etc.) the retrieved data.

Figure 2:
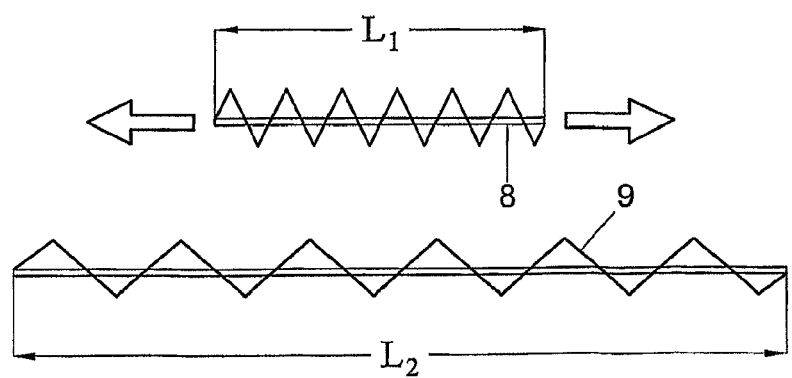
FIG. 2 shows schematically a stretchable dipole.

FIG. 2 shows schematically a stretchable dipole comprising a flexible (capable of being bent and/or flexed) and/or elastic dipole element, capable of being stretched and/or expanded between the lengths L1 and L2 (when only capable of being bent and/or flexed, the effective length—i.e. the distance between the resonator's ends—may vary between L1 and L2.

Figure 3:
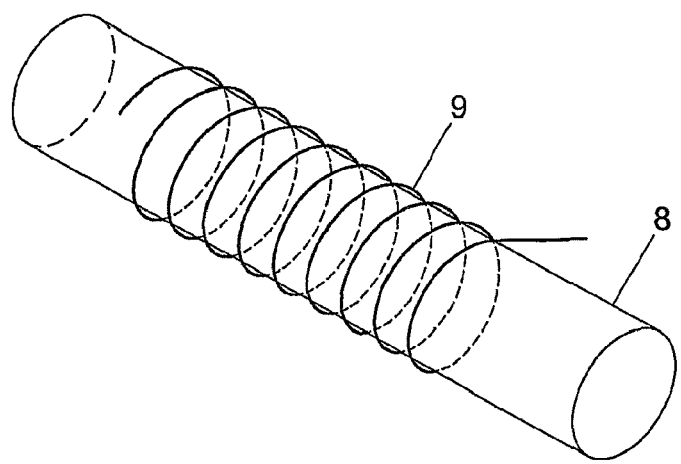
FIG. 3 shows a possible elastic core of the dipole of the garment of FIG. 1.

The construction is illustrated in FIG. 3. The dipole resonator may comprise flexible and/or elastic support core 8, supporting conductive wire (or string) 9, e.g. wound around the support core 8. To be able to be integrated in e.g. garments, the dipole resonator preferably has the form (and dimensions) of filament.

Thus, the dipole resonator 2 in the embodiments of FIG. 1 preferably consists of a flexible, elastic, stretchable, non-conductive, rubber-like core around which a conductive wire—made of copper, aluminum, metallized foil—is (tightly) wound and attached to the ends of the core. The elastic core has an elasticity approximately equal to an elasticity of the garment at a location near the elastic core. In addition or as an alternative to rubber or rubber-like materials, elastane, such as lycra, elaspan, dorlastan or linel are suitable materials from which the elastic core can be formed. The windings make it possible to stretch (elongate) and release (shorten) the resonator. The diameter of the windings is relatively small in order to consider the wounded dipole as a straight dipole wire with a length of half of the wavelength ($L=\frac{1}{2}\lambda$).

Figure 4A:
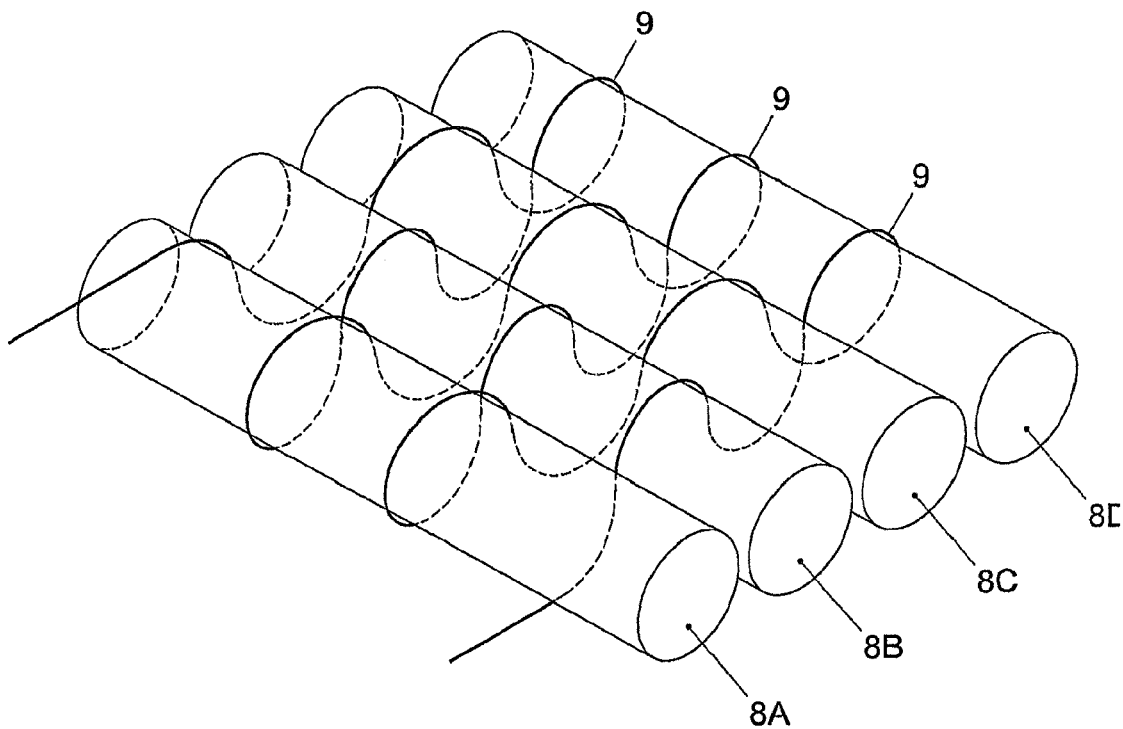
FIG. 4A is a perspective view of possible elastic cores of the dipole of the garment of FIG. 1.
Figure 4B:
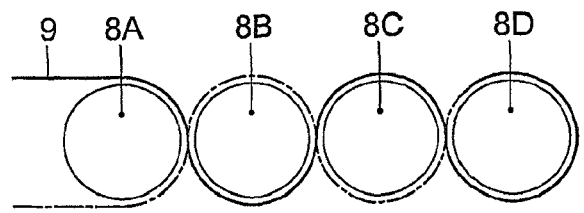
FIG. 4B is a cross sectional view of the elastic cores shown in FIG. 4A.

FIG. 4A is a perspective view of a plurality of elastic cores $8_A$, $8_B$, $8_C$ and $8_D$ around which a conductive wiring 9 is woven. FIG. 4B is cross-sectional view of the elastic cores shown in FIG. 4A. The plurality of elastic cores $8_A$, $8_B$, $8_C$ and $8_D$ may be applied in a garment according to the present invention. The elastic cores 8 are, in the example, positioned substantially parallel. The conductive wire 9 is woven around the elastic cores. In the example shown in FIGS. 4A and 4B the wire is wound from an upper side of elastic core $8_A$ to a lower side of elastic core $8_B$. Then the wire 9 is wound around an upper side of elastic core $8_C$ and then around a lower side of elastic core $8_D$ around a right hand side of the elastic core $8_D$ to a lower side of the elastic core $8_D$. From the position of the lower side of the elastic core $8_D$, the wire is wound around the lower side of elastic core $8_C$. The conductive wire 9 is thus repeatedly wound around an upper side of a first elastic core and subsequently wound around a lower side of a subsequent elastic core.

Instead winding a conductive wire or string around a non-conductive flexible and/or elastic core, the core itself may be made of a conductive rubber (e.g. comprising conductive particles). Furthermore, the resonator may be positioned at a suitable location on the garment. For instance, if the garment is a tight-fitting shirt, the resonator may be positioned at a location of the shirt which, in use, presses against the chest of the person and/or the animal wearing the shirt. This way, the breathing frequency of the person and/or the animal can be measured. Alternatively, the resonator may be located at a location of the shirt which, in use, presses against the back of the person and/or animal wearing the shirt. This way, the periodically reoccurring bending of the person's back and/or animal's back may be detected. Of course this type of garment is also suitable for any other application when bending or deforming of an object or a subject is to be measured.

If the garment is a pair of tight-fitting trousers, the resonator may be located at a location of the trousers which, in use, presses against the front of the knee and/or the back of the knee. Such a location is suitable to measure step frequency during a running exercise. Furthermore, although in the Figures only one conductive wire has been shown in each of the examples, a plurality of conductive wires can be wound around a core as in FIG. 3 or woven around a plurality of cores, as in FIGS. 4A and 4B without deviating from the invention.

The invention claimed is:

1. A garment comprising a sensor to allow remote measuring of length and/or shape variations of a human or animal body wearing the garment, the sensor comprising a dipole resonator which is attached or integrated into the garment so as to vary its length and/or shape in conformity with length and/or shape variations when the garment is worn, the length and/or shape of the resonator determining a resonance frequency of the resonator, wherein the resonator is arranged to resonate a detectable signal at the dipole resonator's resonance frequency, wherein the resonator comprises at least one elastic core and a conductive wire supported by the at least one elastic core in a manner configured to elastically deform along with the garment.

2. The garment according to claim 1, wherein the elastic core comprises an elastane.

3. The garment according to claim 2 wherein the elastane is selected from the group consisting of lycra, elaspan, dorlastan, linel, rubber and a combination thereof.

4. The garment according to claim 1 wherein the elastic core has an elasticity approximately equal to an elasticity of the garment at a location near the elastic core.

5. The garment according to claim 1 the dipole resonator comprising a flexible dipole element configured to be bent and/or flexed.

6. The garment according to claim 1, the dipole resonator comprising an elastic dipole element configured to be stretched and/or expanded.

7. The garment according to claim 1, the dipole resonator having a form of a filament.

8. The garment according to claim 7, said filament being incorporated in textile.

9. The garment according to claim 7, said filament being incorporated in a garment.

10. The garment according to claim 1, the dipole resonator being a half wave dipole resonator.

11. The garment according to claim 1 further comprising detection means for remote detection of the dipole resonator's resonance frequency, the detection means comprising a reflection analyzer.

12. The garment according to claim 1, wherein the conductive wire is supported by a plurality of elastic cores in a manner configured to elastically deform along with the garment.

13. The garment according to claim 12, wherein the conductive wire is woven around the elastic cores, the conductive wire being wound around an upper side of a first elastic core and subsequently wound around a lower side of a subsequent elastic core.

14. A system comprising:
   a garment, the garment comprising a sensor to allow remote measuring of length and/or shape variations of a human or animal body wearing the garment, the sensor comprising a dipole resonator attached to or integrated into the garment so as to vary at least one of its length and shape in conformity with a deformation of the garment, the at least one of the length and shape of the resonator determining a resonance frequency of the resonator, the resonator being configured to resonate a detectable signal at the dipole resonator's resonance frequency, the resonator comprising at least one elastic core and a conductive wire supported by the at least one elastic core in a manner configured to elastically deform along with the garment; and
   a detection means operatively associated with the garment, the detection means being configured to remotely detect the dipole resonator's resonance frequency.

15. The system of claim 14 wherein the detection means comprises a reflection analyzer.

16. A sensor to allow remote measuring of length and/or shape variations of a human or animal body, the sensor comprising:
- a dipole resonator configured to vary its length and/or shape in conformity with a garment worn by the human or animal body, the dipole resonator comprising:
- an elastic core; and
- a conductor supported by the elastic core, the conductor being configured to deform in association with the elastic core and to cause resonance of a detectable signal at a variable resonance frequency; the resonance frequency being variable as a function of deformation of the elastic core.

17. The sensor of claim 16 wherein the conductor comprises a conductive wire wound about the elongate elastic core.

18. The sensor of claim 16 wherein the conductor comprises conductive particles incorporated into the elastic core.

* * * * *